(12) United States Patent
Luo et al.

(10) Patent No.: US 12,008,039 B2
(45) Date of Patent: Jun. 11, 2024

(54) METHOD AND APPARATUS FOR PERFORMING CATEGORISED MATCHING OF VIDEOS, AND SELECTION ENGINE

(71) Applicant: BEIJING ALLOOK TECHNOLOGIES CO., LTD., Beijing (CN)

(72) Inventors: Jiangchun Luo, Beijing (CN); Xiyan Chen, Beijing (CN)

(73) Assignee: BEIJING ALLOOK TECHNOLOGIES CO., LTD, Beijing (CN)

( * ) Notice: Subject to any disclaimer, the term of this patent is extended or adjusted under 35 U.S.C. 154(b) by 1008 days.

(21) Appl. No.: 16/960,837

(22) PCT Filed: Jan. 9, 2019

(86) PCT No.: PCT/CN2019/070968
§ 371 (c)(1),
(2) Date: Jul. 8, 2020

(87) PCT Pub. No.: WO2019/137391
PCT Pub. Date: Jul. 18, 2019

(65) Prior Publication Data
US 2020/0356781 A1 Nov. 12, 2020

(30) Foreign Application Priority Data
Jan. 9, 2018 (CN) .......................... 201810019243.8

(51) Int. Cl.
*G06F 16/78* (2019.01)
*G06F 16/735* (2019.01)
(Continued)

(52) U.S. Cl.
CPC ........ *G06F 16/7834* (2019.01); *G06F 16/735* (2019.01); *G06F 16/75* (2019.01);
(Continued)

(58) Field of Classification Search
CPC .. G06F 16/7834; G06F 16/75; G06F 16/7867; G06F 18/22; G06V 20/41; G06V 20/47; G10L 25/51
(Continued)

(56) References Cited

U.S. PATENT DOCUMENTS

| 8,145,679 B1 | 3/2012 | Baluja et al. |
| 2013/0332462 A1 | 12/2013 | Billmaier et al. |
| 2015/0082330 A1* | 3/2015 | Yun .................. H04N 21/23418 725/18 |

FOREIGN PATENT DOCUMENTS

| CN | 102236669 A | 11/2011 |
| CN | 102654860 B | 9/2012 |

(Continued)

*Primary Examiner* — Michael R Neff
(74) *Attorney, Agent, or Firm* — Blank Rome LLP

(57) ABSTRACT

The object of the present disclosure is to provide a method, apparatus and selection engine for classification matching of videos. The method according to the present disclosure includes: performing multi-dimensional identification of the content of at least one video in order to determine the abstract information of the at least one video; generating the respective classification attribute information of the at least one video based on the respective abstract information of the at least one video, wherein the classification attribute information includes the humanistic attribute information of the video; wherein the humanistic attribute information is used to indicate the value judgement corresponding to the video. The present disclosure has the following advantages: fully excavate various classification attributes of video content through multi-dimensional identification of the video, and then obtains the humanistic attributes of the video. Therefore, it can be sifted based on the humanistic attributes of the video and be recommended to users that are more closely matched.

11 Claims, 1 Drawing Sheet

(51) Int. Cl.
*G06F 16/75* (2019.01)
*G06F 16/783* (2019.01)
*G06F 18/22* (2023.01)
*G06V 20/40* (2022.01)
*G10L 25/51* (2013.01)

(52) U.S. Cl.
CPC .......... *G06F 16/7867* (2019.01); *G06F 18/22* (2023.01); *G06V 20/41* (2022.01); *G06V 20/47* (2022.01); *G10L 25/51* (2013.01)

(58) Field of Classification Search
USPC ........................................................ 382/224
See application file for complete search history.

(56) References Cited

FOREIGN PATENT DOCUMENTS

| | | |
|---|---|---|
| CN | 103473273 A | 12/2013 |
| CN | 106599165 | 4/2017 |
| CN | 106776999 | 5/2017 |
| CN | 106802913 | 6/2017 |
| CN | 107004021 | 8/2017 |
| CN | 108388570 | 8/2018 |

\* cited by examiner

METHOD AND APPARATUS FOR PERFORMING CATEGORISED MATCHING OF VIDEOS, AND SELECTION ENGINE

CROSS-REFERENCE TO RELATED APPLICATIONS

This application is a national phase application of PCT/CN2019/070968, filed Jan. 9, 2019, which claims priority to Chinese Application No. 201810019243.8, filed Jan. 9, 2018. The entire contents of those applications are incorporated herein by reference.

TECHNICAL FIELD

The present disclosure relates to the field of computer technology, in particular to a method, apparatus and selection engine for classification matching of videos.

BACKGROUND

In the search engines of the prior art, when searching for video information, they can only be classified based on some of their external labels. For example, they can search after obtaining external label classification using the title, state, photo, etc. of the video. However, this way cannot truly reflect the information corresponding to the content of the video itself, therefore the results obtained by searching based only on external label classification usually have a low degree of matching.

Moreover, the differences in the background, experience and value judgement of the users themselves will make them inclined to choose different videos. Therefore, how to give the most matching video results to the users with values really close to their contents and truly achieve accurate matching is an urgent problem to be solved.

BRIEF SUMMARY

The object of the present disclosure is to provide a method, apparatus and selection engine for classification matching of videos.

According to an aspect of the present disclosure, there is provided a method for classification matching of videos, wherein the method includes the following steps:
  a. performing multi-dimensional identification of the content of at least one video to determine the abstract information of the at least one video;
  b. generating the respective classification attribute information of the at least one video based on the respective abstract information of the at least one video, wherein the classification attribute information includes the humanistic attribute information of the video; wherein the humanistic attribute information is used to indicate the value judgement corresponding to the video.

According to an aspect of the present disclosure, there is also provided a video classification apparatus for classification matching of videos, wherein the video classification apparatus comprises:
  identification means for multi-dimensional identification of the content of at least one video to determine the abstract information of the at least one video;
  generation means for generating the respective classification attribute information of the at least one video based on the respective abstract information of the at least one video, wherein the classification attribute information includes the humanistic attribute information of the video; wherein the humanistic attribute information is used to indicate the value judgement corresponding to the video.

According to another aspect of the present disclosure, there is also provided a selection engine, wherein the selection engine comprises the video classification apparatus.

Compared with the prior art, the present disclosure has the following advantages: unlike the existing search engines, the selection engine according to the present disclosure can fully excavate various classification attributes of video content through multi-dimensional identification of the video, and then obtains the humanistic attributes of the video. Therefore, it can be sifted based on the humanistic attributes of the video and be recommended to users that are more closely matched. This makes video recommendation more accurate. Furthermore, by analyzing the user's usage scenarios, it can further recommend videos corresponding to each scenario to the user, and further improve the user experience.

BRIEF DESCRIPTION OF THE DRAWINGS

Other features, objectives, and advantages of the present disclosure will become more apparent through reading the following detailed depiction of the non-limitative embodiments with reference to the accompanying drawings.

Same or similar reference numbers in the drawings represent same or similar components.

DETAILED DESCRIPTION

Hereinafter, further detailed description will be made to the present invention with reference to the accompanying drawings.

Wherein, the video classification apparatus executing the method of the present disclosure is implemented by a computer device. The computer device has a memory, a processor, and a computer program stored on the memory and executable on the processor. When executing the corresponding computer program, the processor implements the method executed by an access mean. Furthermore, by storing the corresponding computer program on a computer readable storage medium, when executing the program, the method corresponding to a control mean can be implemented.

Wherein, the computer device includes an electronic device capable of automatically performing numerical calculation and/or information processing according to a preset or stored instruction, and its hardware includes, but not limited to, microprocessors, application specific integrated circuits (ASIC), field programmable gate arrays (FPGA), digital signal processors (DSP), embedded devices, etc. The computer device may include network device and/or user equipment.

Preferably, the computer device includes user equipment and/or network device.

Wherein, the user equipment includes, but not limited to, any kind of electronic products that can be embedded in the vehicle and can interact with the user in a touch-control manner, such as embedded intelligent navigation device, tablet computer, etc. Wherein, the network device includes, but not limited to, a single network server, a server group consisting of multiple network servers, or a cloud consisting of mass hosts or network servers based on cloud computing, wherein cloud computing is a kind of distributed computing, which is a super virtual computer consisting of a group of loosely coupled computer sets.

Wherein, the network where the network device is located includes, but not limited to, Internet, Wide Area Network, Metropolitan Area Network, Local Area Network, VPN (Virtual Private Network) network, etc. It should be noted that the user equipment, network device and network are only exemplary, other existing or future possibly developed network devices and networks, if applicable to the present disclosure, should also be included within the protection scope of the present disclosure and incorporated here by reference.

Preferably, the video classification apparatus according to the present disclosure is included in a selection engine.

The selection engine is used to select the most closely matched result for the user from the massive data.

Preferably, the selection engine is applied in video selection process, and implements to recommend to the user videos that most closely matched with his/her value judgement.

Figure 1:
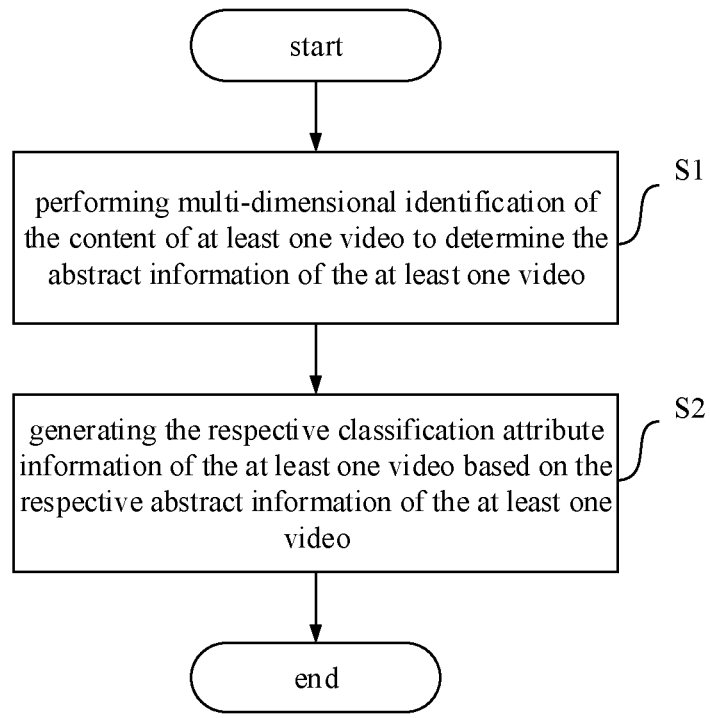
FIG. 1 shows a flow diagram of a method for performing classification matching of videos according to one embodiment of the present disclosure.

Referring to FIG. 1, FIG. 1 shows a flow diagram of a method for performing classification matching of videos according to one preferred embodiment of the present disclosure.

The method according to the present disclosure includes step S1 and step S2.

In step S1, a video classification apparatus performs multi-dimensional identification of the content of at least one video in order to determine the abstract information of the at least one video.

Wherein, the multi-dimensional identification includes identification operations on video content from various aspects such as sound, character, image, etc.

Preferably, the multi-dimensional identification includes, but not limited to, at least any of the following identification ways:
1) sound identification; wherein the sound identification includes identification of the sound content of the video. Preferably, the sound identification operation may include any of the following:
   a) speech category identification; for example, the operation of identifying voice information such as dialogue and narration in the video.
   b) non-speech category identification; for example, the identification operation for non-speech sound elements such as background music, theme music, sound effects in the video.
2) character identification; the identification operation for the characters in the video image. Specifically, the character identification includes the identification of the subtitle information in the video or the identification of the characters contained in the video image. For example, the identification of the characters on the package of a product when the product is presented in a video.
3) image identification, refers to the identification of the image information such as objects, scenarios in the image of the video frame. For example, the identification of the objects such as people, items, animals in the image; or identifies the place name information of the corresponding scenario or the type information of the scenario in the image, such as name of the tourist spot, or work scenario type, coffee shop scenario type, living room scenario type.

Specifically, the video classification apparatus performs multi-dimensional identification of the content of the video to obtain the result text information corresponding to the identification result, and determines the abstract information of the video based on the result text information.

Preferably, after obtaining the result text information, the video classification apparatus determines the abstract information of the video by performing the required text processing operations such as elimination of redundancy, integration and extraction on the result text information.

Next, in step S2, the video classification apparatus generates the respective classification attribute information of the at least one video based on the respective abstract information of the at least one video.

Wherein, the classification attribute information includes the humanistic attribute information of the video; wherein the humanistic attribute information is used to indicate the value judgement corresponding to the video. For example, content with value judgement such as animal protection, fashion pursuit and life purpose.

For example, videos containing luxury brands, idol figures and lavish scenarios are often associated with humanistic attribute concepts such as chic, fashion, high consumption; videos containing content information like games, animations and comics are often associated with quadratic element hobbies.

Preferably, the classification attribute information may further include other classification information determined based on video content identification in addition to the human attribute information, for example, scenario classification information determined based on identification of the scenario presented by the video, theme classification information determined based on identification of the video theme, person classification information determined based on identification of the person appearing in the video, and so on.

Wherein, each category of a video can contain multiple classification information labels of the same type. For example, the scenario classification information of a video may include multiple tourist spot labels, and the actor classification information may include multiple actor labels.

Specifically, the video classification apparatus can determine the classification attribute information corresponding to the respective videos based on individual processing of the abstract information of the respective videos directly, or the video classification apparatus can determine the respective classification attribute information of the respective videos based on the abstract information of multiple videos and by performing comprehensive processing such as aggregation and data mining on the abstract information of a large number of videos; or the video classification apparatus can determine a part of the classification attribute information of the videos by individual processing and determine the other part of the classification attribute information of the videos by comprehensive processing.

More preferably, the video classification apparatus determines the respective humanistic attribute information of at least one video based on the abstract information of the at least one video and in connection with the relevant information of at least one subject area.

Specifically, the video classification apparatus establishes machine learning models for determining the humanistic attribute information in the respective subject areas based on the abstract information and the subject characteristics of the respective subject areas.

According to a preferred solution of the present disclosure, the classification attribute information may further include other classification label information related to the video, such as video popularity information. Wherein, the video popularity information can be determined based on video click count, recommendation count, upvote count, search count and the like.

Next, in step S2 of the preferred solution according to the present disclosure, the video classification apparatus obtains the user humanistic attributes of historical users of the video to determine at least one humanistic attribute information corresponding to the video.

Wherein, the user humanistic attribute information includes the relevant information that reflects the humanistic values of the user. For example, the user is an animal lover, then the corresponding humanistic attribute information may include content such as animal protection, fur resistance and nature protection.

Wherein, the video classification apparatus can determine the user humanistic attributes corresponding to a user based on the historical operations and/or user attribute information of the user.

Preferably, the user humanistic attributes corresponding to a user can be updated according to the user's humanistic attribute information corresponding to the videos that are historically viewed, searched, upvoted by the user; alternatively, the user humanistic attribute information of a user can be determined according to the user related information uploaded by the user himself/herself, such as gender, consumption ability, occupation, income, hobbies, geographic location, living habits and family background.

Specifically, the video classification apparatus obtains the user humanistic attributes of multiple historical users corresponding to a video, and determines at least one humanistic attribute information corresponding to the video by aggregation processing of the user humanistic attributes of the multiple historical users.

Preferably, the method according to the present disclosure further includes step S3 (not shown).

In step S3, the video classification apparatus performs sifting based on the user humanistic attributes of the user and the classification attribute information of multiple videos, and determines at least one video corresponding to the user.

Specifically, by matching the user humanistic attribute information with the humanistic attribute information in the classification attribute information of the respective videos, at least one matched video is determined, and the at least one video is taken as the recommended video corresponding to the user.

According to a preferred solution of the present disclosure, the method further includes step S4 (not shown) and step S5 (not shown), and the step S3 further includes step S301 (not shown).

In step S4, the video classification apparatus obtains the user's usage demands.

Wherein, the usage demands include, but not limited to, any of the following:
1) usage scenario demands, for example, public transportation to work, lunch break, during traveling, planning on traveling, just arriving at travel destination, etc.;
2) emotional demands, for example, hoping to watch a video with a warm theme, as another example, hoping to watch a leisurely video, as yet another example, hoping to watch a more horrifying video, etc.

Specifically, the video classification apparatus determines the user's usage demands by obtaining the scenario related information/emotional related information of the user.

Wherein, the scenario related information includes, but not limited to, any of the following:

1) user's location information, for example, once the user turns on location, the user's current location is determined based on the user's location information. And the location information is taken as the user's scenario information.
2) user's network related information. For example, when the user is connected in the network that he/she has noted as "home network", it is determined that the user is at his/her own home; when the user is connected in the network that he/she has noted as "travel wifi", it is determined that the user is currently traveling.
3) scenario description information submitted by user himself/herself.

Wherein, the emotional related information includes, but not limited to, any of the following:
1) emotional demands information provided by the user; for example, search words provided by the user, as another example, barrage information posted by the user, etc.;
2) environmental impact information; for example, more users might hope to watch warm love movies on Valentine's Day, as another example, some users might hope to watch horror videos on Halloween, etc.

Next, in step S5, the video classification apparatus determines one or more videos corresponding to the usage scenario.

Specifically, the video classification apparatus compares the usage scenario information with the classification attribute information and/or abstract information of the respective videos, and takes the videos with the classification attribute information and/or abstract information corresponding to the scenario information as candidate videos corresponding to the user.

Preferably, the classification attribute information further includes the scenario classification information of the video, the video classification apparatus compares the usage scenario of the user with the scenario classification information of the respective videos, in order to obtain at least one video corresponding to the scenario classification information matched with the usage scenario as the recommended video.

Next, in step S301, the video classification apparatus determines at least one recommended video corresponding to the user based on the respective classification attribute information of the one or more videos and the user humanistic attributes of the user.

Specifically, the video classification apparatus determines one or more candidate videos through step S5, then matches the respective humanistic attribute information of the one or more candidate videos with the user humanistic attributes of the user, and takes the matched candidate video as the recommended video corresponding to the user.

Preferably, the video classification apparatus can further determine the priority of the recommended video according to the degree of matching between the humanistic attribute information of each candidate video and the user humanistic attributes of the user.

The method according to the present disclosure can fully excavate various classification attributes of video content through multi-dimensional identification of the video, and then obtains the humanistic attributes of the video. Therefore, it can be sifted based on the humanistic attributes of the video and be recommended to users that are more closely matched. This makes video recommendation more accurate. Furthermore, by analyzing the user's usage scenarios, it can further recommend videos corresponding to each scenario to the user, and further improve the user experience.

Figure 2:
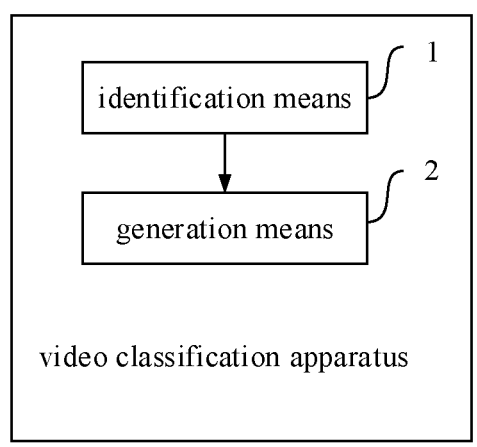
FIG. 2 shows a structural diagram of a video classification apparatus for performing classification matching of videos according to one embodiment of the present disclosure.

Referring to FIG. 2, FIG. 2 shows a structural diagram of a video classification apparatus for performing classification matching of videos according to one preferred embodiment of the present disclosure.

The video classification apparatus according to the present disclosure includes identification means 1 and generation means 2.

identification means performs multi-dimensional identification of the content of at least one video in order to determine the abstract information of the at least one video.

Wherein, the multi-dimensional identification includes identification operations on video content from various aspects such as sound, character, image, etc.

Preferably, the multi-dimensional identification includes, but not limited to, at least any of the following identification ways:

1) sound identification; wherein the sound identification includes identification of the sound content of the video. Preferably, the sound identification operation may include any of the following:
   a) speech category identification; for example, the operation of identifying voice information such as dialogue and narration in the video.
   b) non-speech category identification; for example, the identification operation for non-speech sound elements such as background music, theme music, sound effects in the video.
2) character identification; the identification operation for the characters in the video image. Specifically, the character identification includes the identification of the subtitle information in the video or the identification of the characters contained in the video image. For example, the identification of the characters on the package of a product when the product is presented in a video.
3) image identification, refers to the identification of the image information such as objects, scenarios in the image of the video frame. For example, the identification of the objects such as people, items, animals in the image; or identifies the place name information of the corresponding scenario or the type information of the scenario in the image, such as name of the tourist spot, or work scenario type, coffee shop scenario type, living room scenario type.

Specifically, identification means 1 performs multi-dimensional identification of the content of the video to obtain the result text information corresponding to the identification result, and determines the abstract information of the video based on the result text information.

Preferably, after obtaining the result text information, identification means 1 determines the abstract information of the video by performing the required text processing operations such as elimination of redundancy, integration and extraction on the result text information.

Next, generation means 2 generates the respective classification attribute information of the at least one video based on the respective abstract information of the at least one video.

Wherein, the classification attribute information includes the humanistic attribute information of the video; wherein the humanistic attribute information is used to indicate the value judgement corresponding to the video. For example, content with value judgement such as animal protection, fashion pursuit and life purpose.

For example, videos containing luxury brands, idol figures and lavish scenarios are often associated with humanistic attribute concepts such as chic, fashion, high consumption; videos containing content information like games, animations and comics are often associated with quadratic element hobbies.

Preferably, the classification attribute information may further include other classification information determined based on video content identification in addition to the human attribute information, for example, scenario classification information determined based on identification of the scenario presented by the video, theme classification information determined based on identification of the video theme, person classification information determined based on identification of the person appearing in the video, and so on.

Wherein, each category of a video can contain multiple classification information labels of the same type. For example, the scenario classification information of a video may include multiple tourist spot labels, and the actor classification information may include multiple actor labels.

Specifically, generation means 2 can determine the classification attribute information corresponding to the respective videos based on individual processing of the abstract information of the respective videos directly, or generation means 2 can determine the respective classification attribute information of the respective videos based on the abstract information of multiple videos and by performing comprehensive processing such as aggregation and data mining on the abstract information of a large number of videos; or the video classification apparatus can determine a part of the classification attribute information of the videos by individual processing and determine the other part of the classification attribute information of the videos by comprehensive processing.

More preferably, generation means 2 determines the respective humanistic attribute information of at least one video based on the abstract information of the at least one video and in connection with the relevant information of at least one subject area.

Specifically, generation means 2 establishes machine learning models for determining the humanistic attribute information in the respective subject areas based on the abstract information and the subject characteristics of the respective subject areas.

According to a preferred solution of the present disclosure, the classification attribute information may further include other classification label information related to the video, such as video popularity information. Wherein, the video popularity information can be determined based on video click count, recommendation count, upvote count, search count and the like.

Next, according to the video classification apparatus of the present invention, generation means 2 can also obtain the user humanistic attributes of historical users of the video to determine at least one humanistic attribute information corresponding to the video.

Wherein, the user humanistic attribute information includes the relevant information that reflects the humanistic values of the user. For example, the user is an animal lover, then the corresponding humanistic attribute information may include content such as animal protection, fur resistance and nature protection.

Wherein, the video classification apparatus includes a first determination means (not shown).

The first determination means can determine the user humanistic attributes corresponding to a user based on the historical operations and/or user attribute information of the user.

Preferably, the user humanistic attributes corresponding to a user can be updated according to the user's humanistic attribute information corresponding to the videos that are historically viewed, searched, upvoted by the user; alternatively, the user humanistic attribute information of a user can be determined according to the user related information uploaded by the user himself/herself, such as gender, consumption ability, occupation, income, hobbies, geographic location, living habits and family background.

Specifically, the first determination means obtains the user humanistic attributes of multiple historical users corresponding to a video, and determines at least one humanistic attribute information corresponding to the video by aggregation processing of the user humanistic attributes of the multiple historical users.

Preferably, the video classification apparatus further includes a second determination means (not shown).

The second determination means performs sifting based on the user humanistic attributes of the user and the classification attribute information of multiple videos, and determines at least one video corresponding to the user.

Specifically, by matching the user humanistic attribute information with the humanistic attribute information in the classification attribute information of the respective videos, at least one matched video is determined, and the at least one video is taken as the recommended video corresponding to the user.

According to a preferred solution of the present disclosure, the video classification apparatus further includes an obtaining means (not shown) and a third determination means (not shown).

The obtaining means obtains the user's usage demands.

Wherein, the usage demands include, but not limited to, any of the following:
1) usage scenario demands, for example, public transportation to work, lunch break, during traveling, planning on traveling, just arriving at travel destination, etc.;
2) emotional demands, for example, hoping to watch a video with a warm theme, as another example, hoping to watch a leisurely video, as yet another example, hoping to watch a more horrifying video, etc.

Specifically, the obtaining means determines the user's usage demands by obtaining the scenario related information/emotional related information of the user.

Wherein, the scenario related information includes, but not limited to, any of the following:
1) user's location information, for example, once the user turns on location, the user's current location is determined based on the user's location information. And the location information is taken as the user's scenario information.
2) user's network related information. For example, when the user is connected in the network that he/she has noted as "home network", it is determined that the user is at his/her own home; when the user is connected in the network that he/she has noted as "travel wifi", it is determined that the user is currently traveling.
3) scenario description information submitted by user himself/herself.

Wherein, the emotional related information includes, but not limited to, any of the following:
1) emotional demands information provided by the user; for example, search words provided by the user, as another example, barrage information posted by the user, etc.;
2) environmental impact information; for example, more users might hope to watch warm love movies on Valentine's Day, as another example, some users might hope to watch horror videos on Halloween, etc.

Next, the third determination means determines one or more videos corresponding to the usage scenario.

Specifically, the third determination means compares the usage scenario information with the classification attribute information and/or abstract information of the respective videos, and takes the videos with the classification attribute information and/or abstract information corresponding to the scenario information as candidate videos corresponding to the user.

Preferably, the classification attribute information further includes the scenario classification information of the video, the third determination means compares the usage scenario of the user with the scenario classification information of the respective videos, in order to obtain at least one video corresponding to the scenario classification information matched with the usage scenario as the recommended video.

Next, the second determination means according to the preferred solution determines at least one recommended video corresponding to the user based on the respective classification attribute information of the one or more videos and the user humanistic attributes of the user.

Specifically, the third determination means determines one or more candidate videos, the second determination means matches the respective humanistic attribute information of the one or more candidate videos with the user humanistic attributes of the user, and takes the matched candidate video as the recommended video corresponding to the user.

Preferably, the second determination means can further determine the priority of the recommended video according to the degree of matching between the humanistic attribute information of each candidate video and the user humanistic attributes of the user.

The solution according to the present disclosure can fully excavate various classification attributes of video content through multi-dimensional identification of the video, and then obtains the humanistic attributes of the video. Therefore, it can be sifted based on the humanistic attributes of the video and be recommended to users that are more closely matched. This makes video recommendation more accurate. Furthermore, by analyzing the user's usage scenarios, it can further recommend videos corresponding to each scenario to the user, and further improve the user experience.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

The invention claimed is:

1. A method for classification matching of videos, comprising:

performing multi-dimensional identification of content of at least one video to determine abstract information of the at least one video;

generating classification attribute information of the at least one video based on the abstract information of the at least one video, wherein the classification attribute information includes humanistic attribute information of the at least one video; wherein the humanistic attribute information is used to indicate a value judgement corresponding to the video;

determining the humanistic attribute information of the at least one video based on the abstract information of the at least one video and in connection with relevant information of at least one subject area, wherein machine learning models for determining the humanistic attribute information in the respective subject areas are established based on the abstract information and the subject characteristics of the respective subject areas;

obtaining usage demands of a user, wherein the usage demands include the user's usage scenario demands, emotional demands, or both;

determining one or more videos corresponding to the usage demands; and determining at least one recommended video corresponding to the user based on the respective classification attribute information of the one or more videos and the user humanistic attributes of the user.

2. The method according to claim 1, further comprising:
obtaining user humanistic attributes of historical users of the at least one video to determine at least one humanistic attribute information corresponding to the at least one video.

3. The method according to claim 2, further comprising:
determining the humanistic attribute information corresponding to a user based on historical operations and/or user attribute information of the user.

4. The method according to claim 1, wherein:
the classification attribute information further includes scenario classification information, and
determining the at least one recommended video includes:
comparing with the scenario classification information of the videos based on a usage scenario to obtain at least one video corresponding to the scenario classification information matched with the usage scenario as the recommended video.

5. The method according to claim 1, wherein the multi-dimensional identification includes at least one of the following identification operations:
speech identification;
character identification; or
image identification.

6. A video classification apparatus for classification matching of videos, comprising:
a memory,
a processor coupled to the memory, the processor being configured to:
perform multi-dimensional identification of content of at least one video to determine abstract information of the at least one video;
generate classification attribute information of the at least one video based on the abstract information of the at least one video, wherein the classification attribute information includes humanistic attribute information of the at least one video; wherein the humanistic attribute information is used to indicate a value judgement corresponding to the at least one video;

determine the respective humanistic attribute information of the at least one video based on the abstract information of the at least one video and in connection with relevant information of at least one subject area, wherein machine learning models for determining the humanistic attribute information in the respective subject areas are established based on the abstract information and the subject characteristics of the respective subject areas;

obtain a user's usage demands, wherein the usage demands include the user's usage scenario demands, emotional demands, or both;

determine one or more videos corresponding to the usage demands; and determine at least one recommended video corresponding to the user based on the respective classification attribute information of the one or more videos and the user humanistic attributes of the user.

7. The video classification apparatus according to claim 6, wherein the generation of classification attribute information further comprises:
obtaining user humanistic attributes of historical users of the at least one video to determine at least one humanistic attribute information corresponding to the at least one video.

8. The video classification apparatus according to claim 7, wherein the processor of the video classification apparatus is further configured to:
determine the humanistic attribute information corresponding to a user based on historical operations and/or user attribute information of the user.

9. The video classification apparatus according to claim 6, wherein:
the classification attribute information further includes scenario classification information, and the determining one or more videos corresponding to the usage demands is further used for:
comparing with the scenario classification information of the one or more videos based on a usage scenario to obtain at least one video corresponding to the scenario classification information matched with the usage scenario as the recommended video.

10. The video classification apparatus according to claim 6, wherein the multi-dimensional identification includes at least one of the following identification operations:
speech identification;
character identification; or
image identification.

11. A selection engine comprising:
a video classification apparatus comprising a memory and a processor coupled to the memory, wherein the processor is configured to:
perform multi-dimensional identification of content of at least one video to determine abstract information of the at least one video; and
generate classification attribute information of the at least one video based on the abstract information of the at least one video, wherein the classification attribute information includes humanistic attribute information of the at least one video;
wherein the humanistic attribute information is used to indicate a value judgement corresponding to the video;
wherein, the generation of classification attribute information further comprises:
determining the respective humanistic attribute information of at least one video based on the abstract information of the at least one video and in connection with the relevant information of at least one subject area, and determining, using machine learning models, the humanistic attribute information in the respective subject areas based on the abstract information and the subject characteristics of the respective subject areas;

wherein the processor is further configured to:
obtain a user's usage demands, wherein the usage demands include the user's usage scenario demands, emotional demands, or both;

determine one or more videos corresponding to the usage demands; and determine at least one recommended video corresponding to the user based on the respective classification attribute information of the one or more videos and the user humanistic attributes of the user.

* * * * *